United States Patent

[11] 3,631,774

[72] Inventor James A. Tidd
 Haverhill, Mass.
[21] Appl. No. 43,764
[22] Filed June 5, 1970
[45] Patented Jan. 4, 1972
[73] Assignee Graphic Systems, Incorporated
 Lowell, Mass.

[54] PHOTOCOMPOSING APPARATUS WITH IMPROVED CHARACTER RECORDING APPARATUS AND METHODS
 4 Claims, 6 Drawing Figs.

[52] U.S. Cl. .................................................. 95/4.5
[51] Int. Cl. ............................................ B41b 13/10
[50] Field of Search ........................................ 95/4.5

[56] References Cited
 UNITED STATES PATENTS
 3,115,076 12/1963 Levene ......................... 95/4.5 X Primary Examiner—John M. Horan
Attorney—Rosen & Steinhilper ABSTRACT: A photocomposing machine is illustrated as comprising a character display station, an optical projection station, and a recording station which includes a coherent fiber optics bundle for transmitting the image formed at the output of the projection station to a photosensitive recording material. Image enhancing apparatus and methods are shown for substantially completely eliminating from the recorded characters any image degradation attributable to broken fibers or to fiber interstitial patterns. More particularly, the disclosed image enhancement is accomplished, in part, by a pair of light-dispersing prisms, one at the input to the fiber bundle and the other at the output therefrom. The first prism acts to disperse light from each object point across a number of fibers such that no fiber carries more than a fraction of the light energy constituting the object point. The second prism recombines the dispersed character images to form an achromatic character image. By the use of the prisms, any energy voids in the image at the bundle output due to broken fibers or fiber interstitial patterns appear as low-energy streaks or patterns. A photosensitive recording material is exposed to the image to form a latent character image which is developed to high contrast to substantially completely eliminate any image defects attributable to such energy voids.

INVENTOR
JAMES A. TIDD

BY ROSEN & STEINHILPE
ATTORNEYS

INVENTOR
JAMES A. TIDD
BY
ROSEN & STEINHILPER
ATTORNEYS

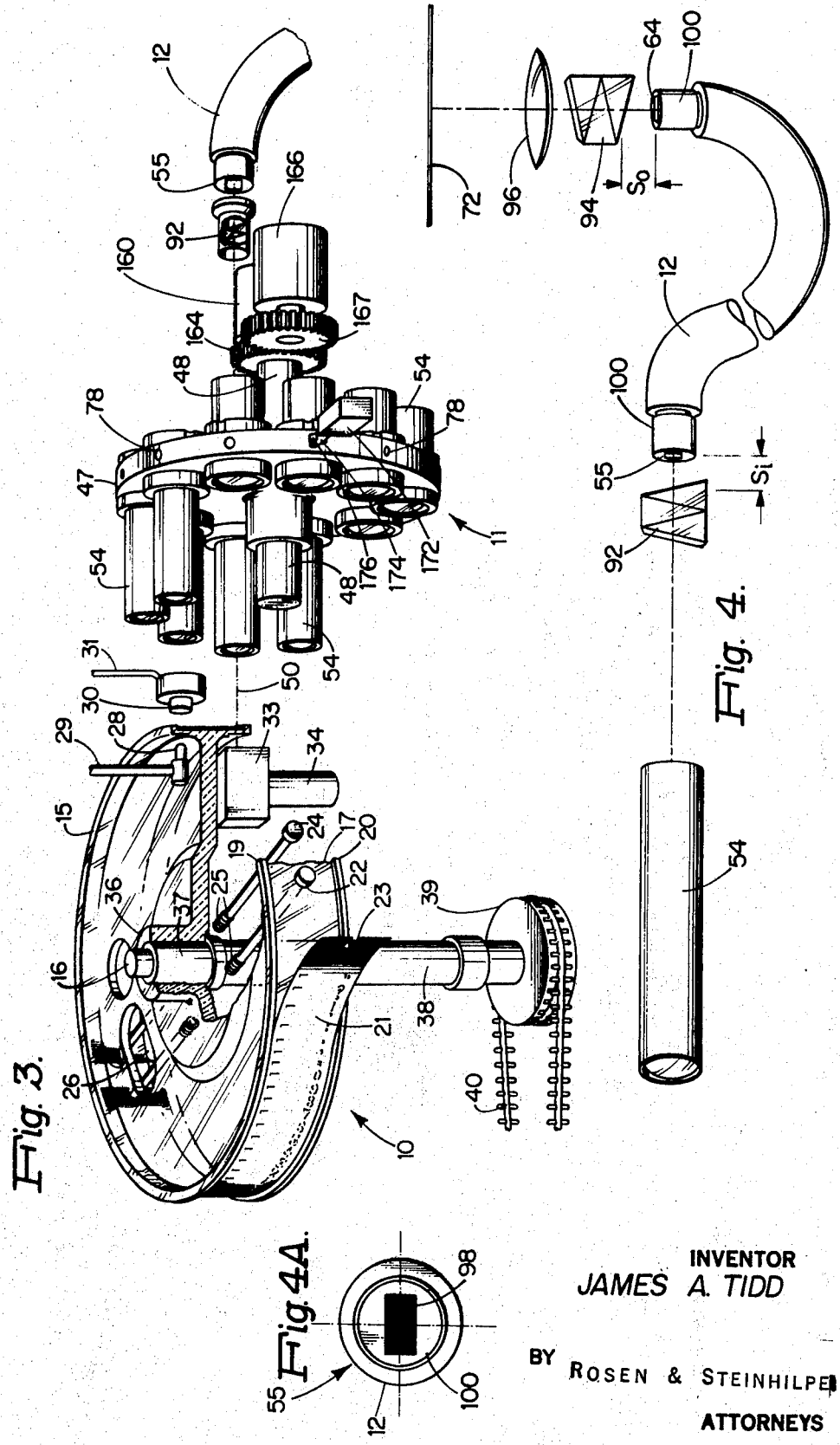

3,631,774

PHOTOCOMPOSING APPARATUS WITH IMPROVED CHARACTER RECORDING APPARATUS AND METHODS

BACKGROUND OF THE INVENTION

This invention concerns photocomposing apparatus having a novel coherent fiber optic image transfer system for transferring a character image derived from an optical storage element to a recording material.

Commercially available coherent fiber optic bundles (bundles which are capable of transferring images by maintaining spatial correspondence between the input and output ends of the individual fibers) are presently of either of two types—a random collection of a large number of individual fibers, or a relatively small number of regularly packed multifibers each containing a number of individual fibers.

In the first type, the smallest fiber unit handled is the individual fiber. This type has the advantage that a broken (or otherwise nontransmissive) fiber has an essentially negligible degrading effect on image quality, however, the practical problem of establishing satisfactory coherence (point-by-point correspondence of the input and output image) is very severe, with the inevitable result that such bundles have relatively poor image transfer characteristics.

The second type, comprising a regularly packed array of multifibers, has much greater coherence and thus higher resolution capability than the described first type. The drawbacks of this type of bundle are, however, that broken multifibers produce objectionable large energy voids in the transferred image, and second that the multifiber interstitial pattern is quite gross and introduces an objectable gridlike pattern running through the transferred images.

The problem of minimizing the effect of such voids which might be present in the image transmitted through a multifiber bundle has been approached in a general way by the use of a complementary pair of image-enhancing prisms. See "*Wavelength Multiplexing in Fiber Optics*" by Charles J. Koester appearing in the Journal of the Optical Society of America, Vol. 58, pp. 63–70.

The effect of such prisms is to convert an energy void or pattern in the transferred imagery into a low-energy smear or pattern. The quality of imagery required in many photocomposing applications is so great, however, that imagery degraded by such low-energy areas would be of unacceptable quality.

OBJECTS OF THE INVENTION

It is an object of this invention to provide photocomposing methods and apparatus exploiting the very substantial advantage of a fiber optic image transfer system without sacrifice of character image fidelity. More particularly, it is an object to provide photocomposing methods and apparatus utilizing in a preferred form of the invention the high-resolution capabilities of the multifiber-type fiber optic bundles while substantially eliminating the inherent image defects due to gross interstitial patterns and broken fiber elements generally associated with the use of multifiber-type bundles.

It is a further object to provide photocomposing apparatus having image enhancing means which is lightweight and readily adaptable to be carried on the transported output end of a fiber bundle image transfer system.

Further objects and advantages of the invention will in part be obvious and will in part become apparent as the following description proceeds. The features of novelty which characterize the invention will be pointed out with particularity in the claims annexed to and forming a part of this specification.

BRIEF DESCRIPTION OF THE DRAWINGS

For a fuller understanding of the principles of this invention, reference may be had to the following drawings wherein

FIG. 3 is an enlarged fragmentary view of a portion of the machine shown in FIGS. 1 and 2;

FIG. 4 is a schematic view of the character imaging system of the FIGS. 1–3 machine;

FIG. 4 A is a view of a fiber bundle shown in FIGS. 1–4 as it would appear from either end.

DESCRIPTION OF THE PREFERRED EMBODIMENTS

Figure 1:
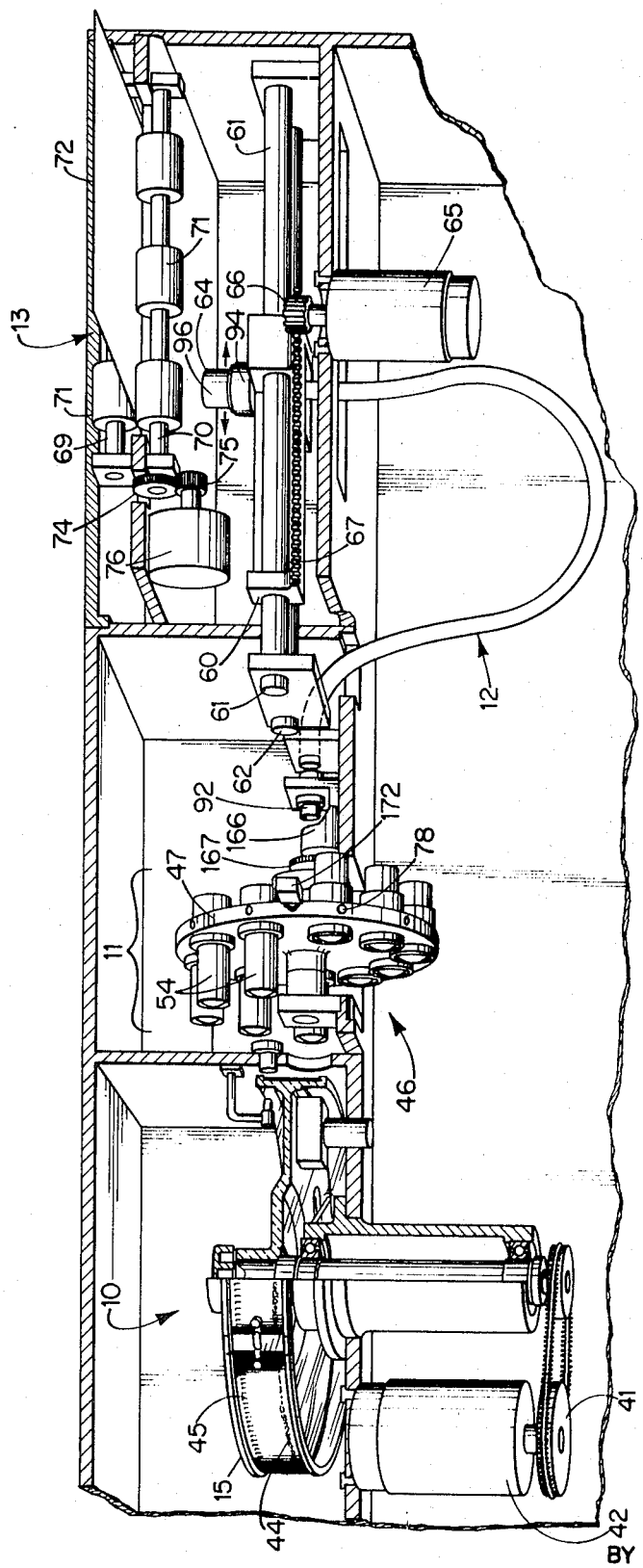
FIG. 1 is a fragmentary perspective view, partly broken away, of a photocomposing machine embodying structure implementing the principles of this invention.

FIGS. 1–6 show a photocomposing machine incorporating a preferred embodiment of the principles of the invention. However, before undertaking a detailed discussion of the inventive concepts, in order that they may be most clearly understood, a brief description of the photocomposing machine as a whole will first be engaged. The drawings illustrate a photocomposing machine including, generally, a character display device 10 in which a selected character is flash-illuminated, an optical projection system 11 for projecting an image of the selected character, and a flexible coherent fiber optic bundle 12 for transferring the projected character image to a recording station 13.

The character display device 10 is illustrated as comprising a character display drum 15 rotatably mounted on an axle 16. The drum 15 is transparent and may be constructed from materials such as glass or certain of the transparent plastic materials. On the periphery of the drum 15 is formed a channel 17 which receives film strips 21 acting as character storage members.

The sides of the channel 17 are defined by a pair of accurately machined flanges 19, 20.

Positioned around the circumference of the drum 15 and associated with the film strip-receiving channel 17 are a plurality of fasteners, here shown as spring-biased rods, which are adapted to penetrate holes 23 in the ends of the film strips 21 and thereby hold the film strips 21. In the FIG. 3, two of the fasteners are designated at 22, 24. Coil springs for biasing the fasteners radially inwardly are shown at 25. Insert holes 26 in the drum 15 permit finger access to the fasteners 22 and 24.

A light source 28 and a photocell 30, arranged on opposite sides of the drum 15, cooperate with a row of timing lines 45 on the film strips 21 to generate a train of pulses useful in monitoring the locations of a row of alphanumeric characters 44 on the film strips 21. The light source 28 is mounted within the character display drum 15 and positioned behind film strip-receiving channel 17. The light source 28 is shown as being mounted on a support member 29 secured to the frame of the machine. The photocell 30 is mounted on a support 31 opposite light source 28.

A stroboscopic flash lamp 33 is positioned within the character display drum 15 and mounted on a suitable support 34 also secured to the frame of the machine. The lamp 33 is capable of being flashed for an extremely short duration, such as, for example, a few microseconds.

The entire drum assembly, consisting of the character display drum 15 and members mounted thereon is rotatably mounted on the axle 15. This is accomplished for example, by means of a hub 36 mounted on a sleeve 37 which may be connected, for example, with a rotatable sleeve 38. At the lower end of the sleeve 38 is a pulley 39 operatively driven by a drive member or belt 40, which, in turn, is operatively mounted to be driven by pulley 41 on a drive motor 42.

Figure 2:
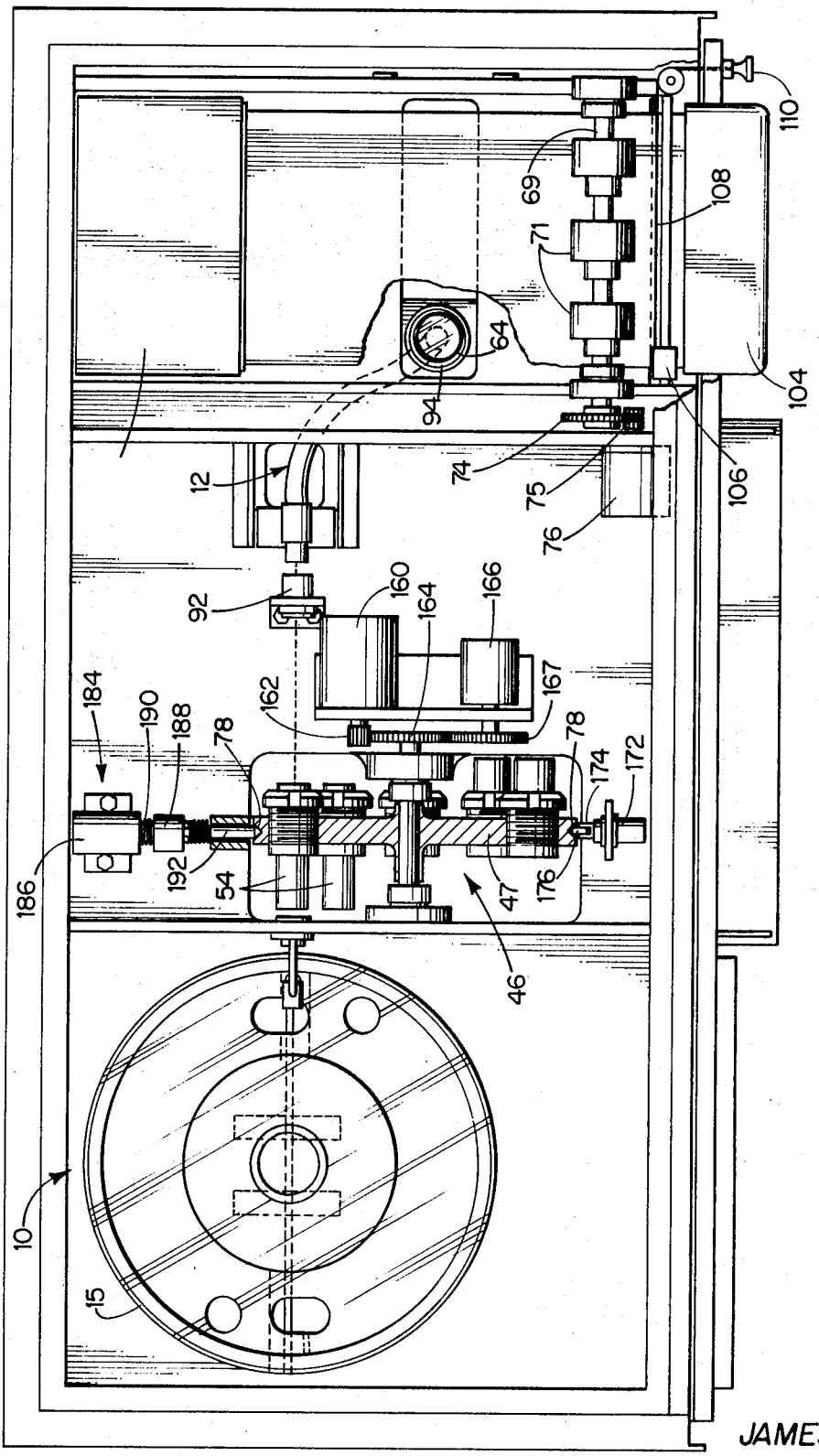
FIG. 2 is a plan view of the machine shown in FIG. 1 with the cabinet partially removed to reveal hidden components.

The optical projection system, generally designated 11, is illustrated in both FIGS. 1 and 2, but is perhaps more readily understood in the enlarged simplified presentation in FIG. 3. This optical projection system includes a lens support in the form of a turret 46 comprising a plate 47 which is rotatably mounted on a shaft 48.

A plurality of projection lenses 54 is mounted on turret 46, each lens being of a different focal length and each being positioned so as to project an image at a predetermined magnification from the film strip 21 along a projection axis 50 to a fixed input end 55 of the fiber optic bundle 12.

In accordance with an invention described and claimed in a copending application assigned assigned to the assignee of the present invention, means are provided for accurately indexing the turret 46 upon command so as to position a selected one of the plurality of lenses 54 precisely on the projection axis 50. To this end, there is provided turret monitoring means for coarsely determining when a selected one of the lenses 54 is approaching the projection axis, and switching means for determining when the selected lens is substantially on the projection axis. The outputs from the turret monitoring means and the switching means are fed to an electronic control circuit which effects energization of a turret drive motor and actuates an accurate locking device to lock the turret 46 with the selected lens precisely on the projection axis 50.

Referring now to the drawings, the structures performing the above-described indexing functions will be discussed. In the illustrated embodiment the turret 46 is driven by a motor 160 through a pair of speed-reducing spur gears 162, 164.

The motor is preferably a relatively small, slow speed AC motor of the unidirectional friction drive type which are readily available commercially at very modest prices.

The turret monitoring means is shown as taking the form of a rotary switch 166 driven at the same rate as the turret 46 by the motor 160 through a spur gear 167 meshed with the spur gear 164 on the turret shaft 48. The switch 166 is here shown as a 10-position switch corresponding in the number os switch terminals to the number of lenses 54 carried by the turret 46.

The means for determining when the selected lens is substantially on the optical projection axis is shown as taking the form of a microswitch 172. The microswitch 172 has a spring-biased plunger 174 carrying on the end thereof a rotatably mounted wheel 176. The outer periphery of the turret plate 47 has conical recesses 78 machined therein with high-potential accuracy, one being located on each of the radials on which the lenses 54 are located. The recesses 78 serve as accurate angular reference points for the lenses 54.

The lens turret 46 preferably contains an even number of lenses 54, 10 in the illustrated embodiment. The lenses 54 are arranged in diametrically opposed pairs. The microswitch plunger 174 is precisely located on the diametrically opposite side of the turret rotational axis from the optical projection axis 50. Thus, when the wheel 176 on the microswitch plunger 174, acting as a cam follower, descends into a recess 78 in the plate 47, the microswitch 172 is actuated to indicate that a projection lens 54 on the opposed side of the turret 46 from the microswitch 172 is located substantially on the optical projection axis 50.

In order to lock the turret 46 securely in place with extreme positional accuracy when the selected lens 54 has been indicated to be located on the optical projection axis, a locking device 184 is provided. The locking device 184 is positioned accurately with respect to the projection axis 50. The locking device 184 is shown as taking the form of a solenoid 186 having a plunger 188 biased outwardly by a coil spring 190. The plunger 188 is shown as having a head 192 which may be composed of Delrin (TM) or the like, having an accurately determined male conical tip configuration which mates with the conical recesses 78 on the periphery of the turret 46.

A photocomposing machine has been operated very satisfactorily with the turret indexing systems operating as follows. A series of characters to be set in type are fed into the system in binary code on a perforated paper tape which is read by a tape reader. The coded character information is fed from the tape reader to input circuits which decode a signal from the tape indicating the magnification of the characters. This signal is fed to a control circuit which compares the coded signal indicating desired magnification with a signal from the rotary switch 166 indicating the magnification of the lens 54 presently on the optical projection axis. If the information does not correspond, that is, if a different lens is needed, the control circuit supplies an energization signal to the solenoid 186 causing the plunger 188 to retract, thereby releasing the turret 46 and closing a a switch in the energization circuit of the motor 160. The motor 160 is thus energized, causing the lens turret 46 to rotate. Simultaneously therewith, the wiping contact in the rotary switch 166 is caused to rotate. When the selected lens 54 is next approaching the optical projection axis, as indicated by a correspondence of the signal from the rotary switch 166 with the coded magnification signal derived from the input circuits and the microswitch 172 signals the location of the selected lens substantially on the projection axis 50, the control circuit deenergizes the solenoid 186. Deenergization of the solenoid 186 causes the coil spring 190 to thrust the head 192 of the plunger 188 into the recess 78 radially registered with the selected lens 54 to thereby lock the selected lens precisely on the projection axis 50. The projection of the plunger 188 into the recess 78 opens the switch on the motor energization circuit to inactivate the turret drive motor 160.

The microswitch 172 has been described as signaling when a lens 54 is located substantially on the optical projection axis. This description should be construed to allow for a small lead time since, in practice, the actuation of the plunger 188 is preferably caused to slightly lead the position of the turret 46, that is to say, the locking device 184 preferably is deenergized slightly before the selected lens 54 is on the projection axis. This provision eliminates the possibility that the turret 46, which is preferably driven unidirectionally, might overrun the index position. The mating conical configuration of the plunger 188 and recesses 78 performs an extremely precise positioning function and determines the accuracy of the turret position when locked at an index location.

The recording station, generally designated 13, comprises means to mount the output end 64 of the coherent fiber optic bundle 12 movable in a stepwise scanning mode and means to mount a photosensitive recording material 72 preferably movable at a 90° angle to the scanning motion of the bundle end 64, all as hereinafter described.

A carriage 60 supporting the bundle end 64 is movably mounted on guide rods 61 and 62 which are, in turn, mounted on the machine frame transverse to the path of the photosensitive material. A stepping motor 65 drives a pinion 66 operably engaging a rack 67 which transports the carriage 60 and thus the output end 64 of the bundle 12 across the photosensitive material 72.

Positioned on the recording station are an idling upper shaft 69 and a driven lower shaft 70. The shafts 69, 70 carry sheet feed rollers 71 operable to convey a sheet or web of photosensitive material 72 across the recording station in a direction at right angles to the direction of motion of carriage 60. A drive gear 74 mounted on lower drive shaft 70 is driven by a stepping motor 76 through an intermediate gear 75.

The output terminal end 64 of the fiber bundle 12 preferably terminates in a relay lens 96 (See FIG. 4) positioned to focus onto the photosensitive material 72 the character images transmitted by the fiber optic bundle 12.

The photocomposing machine is illustrated as including a light-tight cassette 104 for temporarily storing exposed photosensitive material and a cutter for severing the photosensitive material to allow removal of the cassette 104 to a remote processing facility.

The cutter is shown as including a carriage 106 which mounts a knife (not shown) so as to extend downwardly therefrom. The carriage 106 is connected through a draw strand 108 to a knob 110. The carriage 106 may be drawn across the photosensitive material to sever it by the operator pulling on the knob 110.

Figure 5:
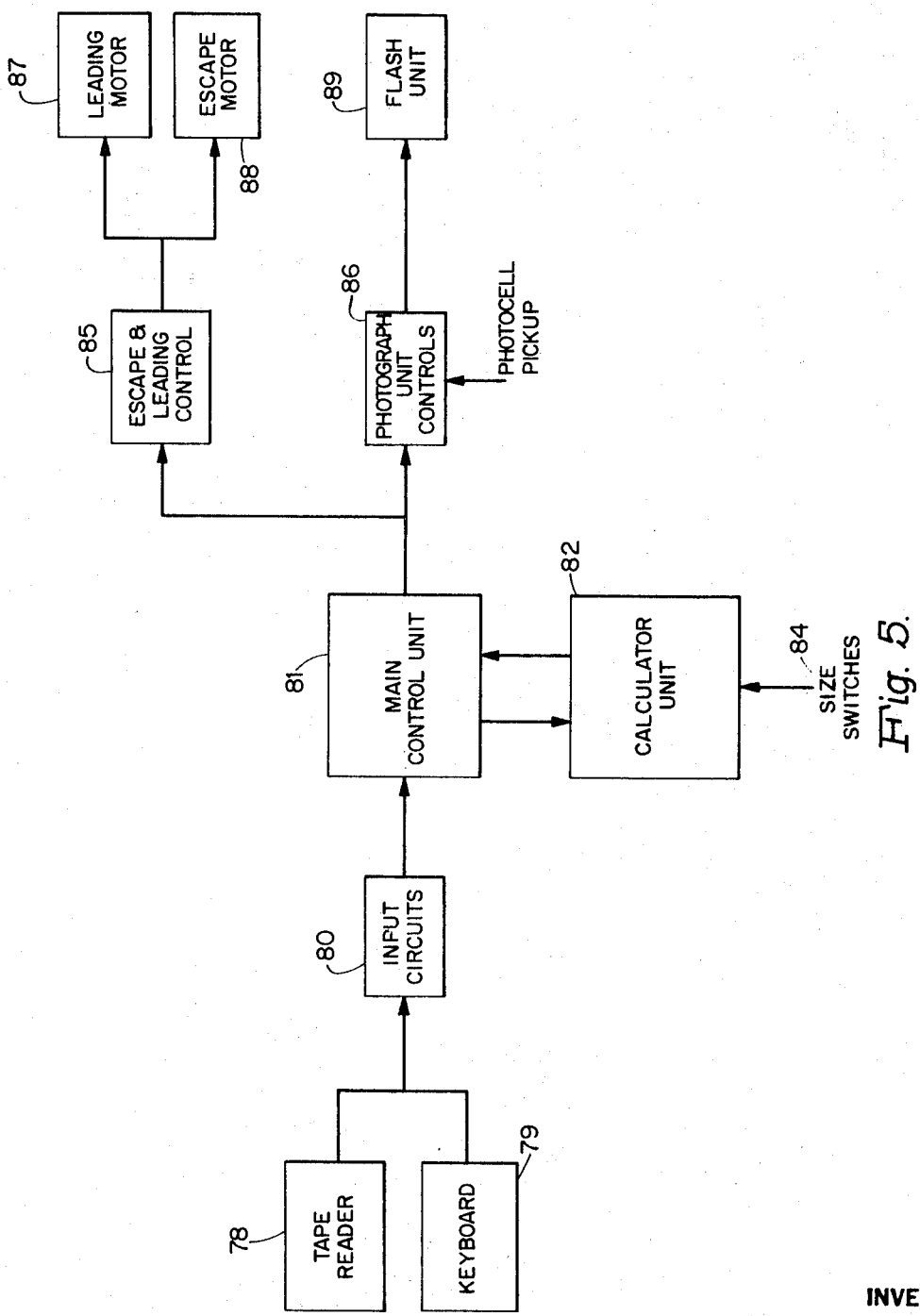
FIG. 5 is a block diagram of the control circuitry for the FIGS. 1–4 machine.

FIG. 5 illustrates a flow diagram of an electronic control center for the control and operation of the machine. The control center generally comprises a tape reader 78 and a keyboard 79 alternatively operable to supply an input signal into input circuits 80. The input circuits 80, in turn, feed into a main control unit 81. A calculator unit 82 is connected to receive signals from size switches 84 (rotary switch 166 in FIGS. 1-3) and to receive a signal from main control unit 81 and to return a signal into main control unit 81. An output signal from main control unit 81 is fed to an escape and leading control 85, which, in turn, feeds an output signal to the leading motor 87 and the escape motor 85. The main control unit 81 also feeds a signal to the photograph unit control 86 which receives a signal from the photocell pick up (illustrated for example as photocell 30 in FIG. 3). The output of the photograph unit control 86 is a signal operating flash unit 89 (to flash lamp 33 in FIG. 3.)

The photocomposing machine may be manually controlled however, it is preferably operated in an automatic mode of operation. In automatic operation of the machine, the control of the operation is achieved by the automatic electronic control center illustrated in FIG. 5. The character display drum 15 is constantly rotated at a desired speed such as, for example, about 2,000 r.p.m. The electronic control center keeps track of the character which is in the operable position and its precise location thereon by counting the timing lines 45 by means of lamp 28 and photocell 30. A coded input signal is introduced into the electronic control center which translates this signal into a character designation which is represented by the count and position of timing lines 45. Simultaneously, stepping motor 65 advances the output end 64 of the bundle 12 in a scanning mode across the face of the recording material 72. When the output end 64 is at the desired printing position, the electronic control then triggers lamp 33 to flash the character onto the recording material at the precise position desired.

While the size of steps taken by stepping motor 65 is not limited to a specific number, nor are sizes of other factors in operation, some general guidelines have been found useful in building a practical machine. For example, the character drum 15 can rotate at many hundreds of revolutions per minute, and a rotation of 2,000 r.p.m. has given good machine speed coupled with good quality character recording. In one embodiment of the machine, stepping motor 65 moves at 0.0025 inch per step, moving 800 steps per revolution.

To view the automatic operation of the photocomposing machine more specifically, a coded input signal such as may be received from a tape reader 78, a keyboard 79 or directly from the transmission wire is received and fed into the input circuits 80. The input circuits appropriately receive the signal and operate shift register memories, gates and the like, to translate the input signal into character information as needed. This character information is then fed to the main control unit 81 which receives, simultaneously, size information from the calculator unit and the input character information. This main control unit decides when it has received character information corresponding to a full line and sends this information to the calculator unit 82. The calculator unit thereupon evaluates the length of the alphanumeric character line corresponding to the information transmitted to it from the main control unit, and calculates the number and size of spaces needed to complete the justified line. It sends this information back to the control unit 81 so that the control unit has now received information defining sequence of characters and spaces equivalent to a complete justified line of alphanumeric information. This information is then translated into time pulses corresponding to character and to line position. The information regarding character identification is fed to the photograph unit control 86 which receives also the count of character position from the photocell pick up. When the character identification coincides with this count of character position, the photograph unit controls trigger the flash unit. In this manner, the flash unit is triggered when the identified character on the character storage member 21 is operatively positioned between lamp 33 and lens 54.

The main control unit also feeds the signal corresponding to character information and position to the escape and leading control. The information regarding escape control is then fed to the leading motor 87 which operates stepping motor 65 to move the output terminal of the fiber optic bundle 12 horizontally across the line of alphanumeric character information.

For each character input from the keyboard or tape reader, the control unit causes the output terminal 66 of the fiber optic bundle to be stepped across the line to the desired position for recording the appropriate character. When it reaches this position, it momentarily stops to await the flash as controlled by flash unit 89 so that the appropriate character from character storage member 21 is flashed onto the photosensitive paper or film. The escapement motor then moves the output terminal 66 to the next recording position where flash unit 89 again operates the flash to record the next character. At the end of the line, the signal from escape and leading control 85 operates the leading motor to move the paper or strip in the vertical direction for the recording of the next line.

In the manner described an automatic, semiautomatic or manual machine can produce a typed tape or long distance signal controlled master which is or can be converted by known methods into a high-quality printing master or plate easily, efficiently and effectively.

In accordance with this invention, means and methods are provided for enhancing character images transmitted through a coherent fiber optic bundle, preferably a bundle of the multifiber type, by substantially completely eliminating any image degradation caused by gross multifiber interstitial patterns and broken multifibers. This end is achieved by the use of a pair of like light-dispersing prisms 92, 94 and high contrast processing of the latent photographic character images. As shown with particular clarity in FIG. 4, prisms 92, 94 are located one spaced from the input end 55 of the fiber bundle and the other spaced a like distance from the output end 64 thereof. The prisms disperse the input and output beams equally but oppositely such that light from each object point is dispersed into a spectrum spreading over a number of fibers (or in the illustrated preferred embodiment, over a number of multifibers). In effect, no single multifiber carries more than a fraction of the light constituting any given object point. Thus a broken (or otherwise nontransmissive) multifiber results in a loss of only the said fraction of the total energy representing the object point.

The described first prism 92 for dispersing the character images (hereinafter the image-dispersing prism) is illustrated as being located in the image space of the projection lens 54 and spaced a predetermined distance, $S_i$ from the input end 55 of the fiber bundle 12. The described second prism, hereinafter termed the image-recombining prism 94, is spaced an equal distance, $S_o$ from the output end 64 of the fiber bundle 12. A relay lens 96 relays the image formed at the output end 64 of the fiber bundle 12 to the recording material 72. The second prism 94 recombines the dispersed character images to form an achromatic character image.

The prism 92 and 94 are shown as being of the so-called "direct vision" type comprising a combination of component prisms of different index and dispersing power so constructed and arranged to have canceling deviation but noncanceling dispersion. Thus light of a predetermined mean wavelength is undeviated in passing through the prisms—light of wavelengths on one side of the mean wavelength are deviated to one side of the optical axis and light of wavelengths on the other side of the mean wavelength are deviated symmetrically to the other side of the optical axis.

It is important that the space $S_i$ between the image dispersing prism 92 and the input end 55 of the fiber bundle 12 is equal to the space $S_o$ between the image-recombining prism 94 and the output end 64 of the bundle 12 in order that the dispersion distances at the input and output ends 55, 64 of the bundle 12 are caused to be equal. That is to say, the amount of lateral shift introduced by the first prism of image rays for each wavelength before entering the bundle must be countered by an equal but opposite lateral shift of each ray by the second prism before recombination of all rays. The prisms 92, 94 are of a commercially available type; it has been found that prisms designated CHROMATIC ENHANCER made by the American Optical Company of Southbridge, Mass. perform very satisfactorily.

For the above-discussed reasons of resolution maximization the fiber bundle 12 is preferably of the so-called multifiber type consisting of a number of multifibers regularly packed in a two-dimensional array. Each multifiber contains a number of optically segregated individual fibers fused into a strand which is thin enough to be flexible. By way of example, excellent results have been obtained using a multifiber bundle made by the American Optical Company which is roughly 3 feet long and has a usable ares 0.260×0.360 inches made up of a close-packed array of 0.002×0.002 inch multifibers each containing a coherent assembly of 10 micron fibers. The usable areas of the bundle ends 55, 64 are defined by a rectangular window 98 in an opaque cap 100.

The coherence of the bundle is ±0.001 inch over 95 percent of the usable area and ±0.002 inch over 100 percent of the area. FIG. 4 A shows, grossly exaggerated in size, the gridlike multifiber interstitial pattern which is characteristic of the multifiber-type bundle. As discussed herein, the pattern would seriously, and in some applications, intolerably, degrade recorded character imagery without the use of the image enhancement methods and structures of the invention.

The multifiber-type bundle also suffers from having a relatively large unit fiber (the multifiber) which, if broken, produces an objectionably large energy void in a transmitted image. Image defects attributable to broken multifibers may also be substantially completely eliminated by following the teachings of this invention. By the use of the prisms 92, 94 a void caused by a broken fiber appears at the output end 64 of the bundle 12 as an elongated smear of relatively low energy. Thus, by this expedient, there is some energy filling of the voids. However, as discussed above, in photocomposition a character image having even a smear such as is produced by a void transmitted through a fiber bundle even with image-enhancing prisms 92, 94 above, is apt to be unacceptably degraded for many applications.

In accordance with another significant aspect of this invention, the latent character images formed on the photosensitive material 72 are developed in a high-contrast (high-gamma) developing process so as to effectively overdevelop any relatively low-energy smears or patterns which might be present in the image, and thereby substantially completely eliminate any degradation of the developed image due to the effect of a nontransmissive multifiber or multifiber interstitial pattern.

To this end, it has been found that very satisfactory results are obtained if the recording material is Grade S Ektamatic typesetting film made by Eastman Kodak Company of Rochester, N.Y. This film may be exposed to form a latent character image. The latent image is preferably developed in a stabilization-type process in which the film passed through an activator, which may be an activator designated A–10 made by the Eastman Kodak Company and then into a stabilizer, for example, a stabilizer designated S–40 made by the same company. If the above-described development process is followed in accordance with the basic instructions provided for using the described activator and stabilizer, any relatively low-energy smears or patterns produced by energy discontinuities in the transmitted image become substantially completely undetectable.

Whereas the invention has been described as being particularly useful when employed with fiber optic bundles of the multifiber type, the inventive principles may also be applied to character recording through fiber bundles of the nonmultifiber type.

Certain changes may be made in the above-described apparatus and method without departing from the true spirit and scope of the invention herein involved. It is therefore intended that the above depiction shall be interpreted as being illustrative, and not in a limiting sense.

I claim:

1. In a photocomposing process, the method comprising:
selecting a character to be recorded and locating said character on an optical axis;
illuminating said character with a sharp pulse of light having a spectrum of wavelengths;
dispersing said character image to form component images of the character constituted in light of different wavelengths;
forming an image of the illuminated character above said axis;
transmitting said dispersed component images to a recording location through a fiber bundle such that said component images are transmitted through said bundle in different patterns of fibers;
recombining at the output of the fiber bundle the dispersed component images, whereby energy voids in a character image at the output of the bundle appear after recombination as streaks or patterns of relatively low energy;
exposing a photosensitive recording material to the recombined character image; and
developing the latent character image on said photosensitive material to high contrast so as to effectively overdevelop relatively low-energy streaks or patterns which might be present in the image and thereby substantially completely eliminate any degradation of the developed character image due to any such energy voids.

2. In a photocomposing process, the method comprising:
selecting a character to be recorded and locating said character on an optical axis;
illuminating said character with a sharp pulse of light having a spectrum of wavelengths;
forming an image of the illuminated character above said axis;
dispersing said character image to form component images of the character constituted in light of different wavelengths;
transmitting said dispersed component images to a recording location through a fiber bundle comprising a two-dimensional regularly packed array of multifibers such that said component images are transmitted through said bundle in different patterns of multifibers;
recombining at the output of the fiber bundle the dispersed component images, whereby energy voids in a character image at the output of the bundle caused by a broken multifiber or multifiber interstitial patterns appear after recombination as streaks or patterns of relatively low energy;
exposing a photosensitive recording material to the recombined character image; and
developing the latent character image on said photosensitive material to high contrast to effectively overdevelop any relatively low-energy streaks or patterns which might be present in the image and thereby substantially completely eliminate any degradation of the developed image due to such energy voids.

3. In photocomposing apparatus, character imaging means comprising:
display means for displaying a character to be recorded;
a coherent fiber optic bundle having an input end and an output end;
lens means for focusing an image of said character at said input end of said fiber optic bundle; and
a pair of light-dispersing prisms and means for positioning a first one of said prisms between said display means and said input end of said bundle and for positioning the second prism adjacent said output end of said bundle such that said first prism disperses each character image formed at said input end to cause component images of a character formed in different wavelengths of light to be transmitted through said bundle in different patterns of fibers, and such that said second prism recombines said dispersed images, whereby energy voids in a character image at said output end of said bundle caused by broken fibers are partially filled and thereby rendered less degrading of character image fidelity.

4. In photocomposing apparatus, the combination comprising:
carrier means carrying a plurality of characters;

means for continuously and unidirectionally moving said carrier means to bring said characters successively onto a projection axis;

means for illuminating selected ones of said characters with light having a spectrum of wavelengths as each crosses said projection axis;

a coherent fiber optic bundle having an input end and an output end, said bundle comprising regularly packed two-dimensional array of multifibers each containing a number of individual fibers;

lens means for focusing an image of each of said illuminated characters at said input end of said fiber optic bundle;

a like pair of light-dispersing prisms and means for positioning a first one of said prisms on said projection axis a predetermined distance from said input end of said bundle and for positioning the second prism a like distance from said output end of said bundle such that the first prism disperses each character image formed at said input end to cause component images of a character formed in different wavelengths of light to be transmitted through said bundle in different patterns of multifibers and such said second prism recombines said dispersed character images, whereby energy voids in a character image at said output end of said bundle caused by broken multifibers and multifiber interstial patterns are partially filled and thereby rendered less degrading of character image fidelity; and relay lens means for relaying an image of the recombined character image onto a recording material.

* * * * *